(12) United States Patent
Shibata et al.

(10) Patent No.: US 9,904,430 B2
(45) Date of Patent: Feb. 27, 2018

(54) ANTENNA-EQUIPPED TOUCH PANEL HAVING AN OPENING BETWEEN ANTENNA PATTERN AND DETECTION PATTERN

(71) Applicant: Nissha Co., Ltd., Kyoto-shi (JP)

(72) Inventors: Junichi Shibata, Kyoto (JP); Inyeol Moon, Kyoto (JP); Shuzo Okumura, Kyoto (JP)

(73) Assignee: NISSHA CO., LTD., Kyoto-shi (JP)

( * ) Notice: Subject to any disclaimer, the term of this patent is extended or adjusted under 35 U.S.C. 154(b) by 0 days.

(21) Appl. No.: 15/479,035

(22) Filed: Apr. 4, 2017

(65) Prior Publication Data

US 2017/0205919 A1    Jul. 20, 2017

Related U.S. Application Data

(63) Continuation of application No. PCT/JP2016/068646, filed on Jun. 23, 2016.

(30) Foreign Application Priority Data

Jul. 3, 2015    (JP) .................................. 2015-134010

(51) Int. Cl.
*G06F 3/044* (2006.01)
*H01Q 1/24* (2006.01)

(52) U.S. Cl.
CPC ............ *G06F 3/044* (2013.01); *H01Q 1/242* (2013.01)

(58) Field of Classification Search
None
See application file for complete search history.

(56) References Cited

U.S. PATENT DOCUMENTS

2014/0043261 A1* 2/2014 Wang ...................... G06F 3/041
345/173
2014/0218637 A1* 8/2014 Gao ...................... H05K 3/1258
349/12

(Continued)

FOREIGN PATENT DOCUMENTS

CN    103593084 A    2/2014
JP    2006-319228 A    11/2006

(Continued)

OTHER PUBLICATIONS

Decision to Grant a Patent dated Oct. 18, 2016 in Japanese Application No. 2016-554512.

(Continued)

*Primary Examiner* — Chad Dicke
(74) *Attorney, Agent, or Firm* — Oblon, McClelland, Maier & Neustadt, L.L.P.

(57) ABSTRACT

An antenna-equipped touch panel is one that is laminated on a display device in order to be used. The antenna-equipped touch panel includes an antenna pattern including an antenna element and a first wire of an antenna, the first wire being electrically connected to the antenna element; and a detection pattern including electrodes and second wires of the touch panel, the second wires being electrically connected to the electrodes. In plan perspective view, a shortest distance between the antenna pattern and the detection pattern is greater than or equal to 1.0 mm and less than or equal to 20.0 mm.

6 Claims, 6 Drawing Sheets

(56) References Cited

U.S. PATENT DOCUMENTS

| | | | | |
|---|---|---|---|---|
| 2014/0375909 A1* | 12/2014 | Misaki | .................... | G06F 3/044 349/12 |
| 2015/0199042 A1* | 7/2015 | Standing | ................. | G06F 3/044 345/174 |
| 2016/0218414 A1* | 7/2016 | Samardzija | ............. | G06F 1/163 |

FOREIGN PATENT DOCUMENTS

| JP | 2010-245573 A | 10/2010 |
|---|---|---|
| JP | 3171994 U | 11/2011 |

OTHER PUBLICATIONS

International Search Report dated Aug. 2, 2016 in PCT/JP2016/068646 filed on Jun. 23, 2016.

* cited by examiner

ANTENNA-EQUIPPED TOUCH PANEL HAVING AN OPENING BETWEEN ANTENNA PATTERN AND DETECTION PATTERN

CROSS-REFERENCE TO RELATED APPLICATIONS

This application is a continuation of International Application No. PCT/JP2016/068646, filed Jun. 23, 2016, which claims priority to Japanese Application No. 2015-134010, filed Jul. 3, 2015, the entire contents of which are incorporated herein by reference.

BACKGROUND OF THE DISCLOSURE

1. Field of the Disclosure

The present disclosure relates to an antenna-equipped touch panel. The touch panel is a display unit and an input unit of a device having a radio communication function and that is equipped with a communication antenna.

2. Description of the Related Art

A touch panel is used as a display unit and an input unit of a device, such as a smartphone, a cellphone, or a tablet terminal. Such devices are equipped with a radio-communication transmission/reception antenna. Such devices have installed therein a touch panel having a touch detection function, and an antenna having a radio-signal transmission/reception function and provided separately from the touch panel.

A detection electrode of the touch panel and an antenna element may both be formed from a conductive film. Therefore, if an antenna-equipped touch panel is manufactured and is installed in such devices, for example, manufacturing steps of such devices are simplified, and space for components is saved.

A touch panel includes electrodes and wires (called second wires) that are electrically connected to the electrodes (see, for example, Japanese Unexamined Patent Application Publication No. 2010-238052). In the present disclosure and in the present specification, a planar region in the touch panel where the electrodes are disposed is called an electrode area, and a planar region in the touch panel where the second wires are disposed is called a second wire area.

In equipping the touch panel with an antenna, when the antenna is disposed in the second wire area, the second wires and the antenna are superimposed upon each other in plan perspective view. When the antenna is disposed in the electrode area, the electrodes and the antenna are superimposed upon each other in plan perspective view.

The antenna is normally in a low impedance state. The impedance of the electrodes of the touch panel is normally higher than that of the antenna.

When the antenna is superimposed upon the electrodes and the second wires, which are structural elements of the touch panel, electrical coupling occurs between the antenna and the electrodes and between the antenna and the second wires even if they are not in contact with each other. The electrical coupling adversely affects the detection characteristics of the touch panel. Examples of the adverse effects are: (1) false detection in which, although the touch panel is not being touched, a touch-operation signal is issued, or, in which although the touch panel is being touched, a touch-operation signal is not issued; and (2) a ghost phenomenon in which a touch operation is detected at a location that differs from a location that is touched.

SUMMARY OF THE DISCLOSURE

Accordingly, it is an object of the present disclosure to provide an antenna-equipped touch panel that does not have adverse effects on the detection characteristics of the touch panel.

Other objects of the present disclosure are clarified on the basis of the description of the present disclosure.

Means for solving the problems are hereunder described. In order to facilitate understanding, symbols corresponding to those used in embodiments according to the present disclosure are used to describe the present disclosure. However, the present disclosure is not limited to these embodiments. A number, which is a symbol, may collectively denote components, etc.; and, when, for example, an individual component is to be denoted in the embodiments described below, it may be denoted by such a number followed by a letter of the alphabet.

According to an aspect of the present disclosure, an antenna-equipped touch panel (1) is an antenna-equipped touch panel that is laminated on a display device (51) in order to be used, and includes an antenna pattern (20) that includes an antenna element (21) and a first wire (22) of an antenna, the first wire (22) being electrically connected to the antenna element, the antenna pattern (20) being formed from a conductive film; and a detection pattern (30) that includes electrodes (31, 36) and second wires (32, 37) of the touch panel, the second wires (32, 37) being electrically connected to the electrodes, the detection pattern (30) being formed from a conductive film. In the touch panel (1), in plan perspective view, a shortest distance (6) between the antenna pattern and the detection pattern is greater than or equal to 1.0 mm and less than or equal to 20.0 mm.

The antenna-equipped touch panel (1) may further include a pattern that is formed from a low relative dielectric constant layer and that is disposed between the antenna pattern and the detection pattern, the value of a relative dielectric constant (Er) of the low relative dielectric constant layer being greater than 1.0 and less than or equal to 2.5.

The antenna-equipped touch panel (1) may be such that a detecting method of the touch panel is a capacitive method, the electrodes include a plurality of transmission electrodes (Tx) and a plurality of reception electrodes (Rx), the second wires include transmission wires that are drawn out from the transmission electrodes (Tx) and reception wires that are drawn out from the reception electrodes (Rx); may further include a first panel surface on which the transmission electrodes (Tx) and the transmission wires are disposed, and a second panel surface on which the reception electrodes (Rx) and the reception wires are disposed; and may be such that the antenna element and the first wire are disposed on a peripheral edge portion of at least one of the first panel surface and the second panel surface in the plan perspective view.

The antenna-equipped touch panel (1) may be such that one of surfaces of one base member is the first panel surface and the other surface of the one base member is the second panel surface, and, in the plan perspective view, the base member has an opening between the antenna pattern and the detection pattern.

The antenna-equipped touch panel (1) may be such that one of surfaces of one of two base members is the first panel surface, and one of surfaces of the other of the two base members is the second panel surface, and, in the plan perspective view, at least the base member having the antenna pattern thereon has an opening between the antenna pattern and the detection pattern.

The antenna-equipped touch panel (1) may be such that one of surfaces of one base member is the first panel surface and the second panel surface, and, in the plan perspective view, the base member has an opening between the antenna pattern and the detection pattern.

According to another aspect of the present disclosure, a touch screen includes a display device and an antenna-equipped touch panel that is laminated on the display device, in which the antenna-equipped touch panel is any one of above-described antenna-equipped touch panels.

According to still another aspect of the present disclosure, a touch screen (2) includes a display device and an antenna-equipped touch panel that is laminated on the display device, with the antenna-equipped touch panel being an antenna-equipped touch panel according to the present disclosure.

The above-described disclosures, preferred embodiments of the present disclosure, and structural elements included therein can be carried out by combining them to the extent possible.

According to the antenna-equipped touch panel according to the present disclosure, since the antenna pattern and the detection pattern are separated by a particular distance, electrical coupling does not occur between the antenna and the detection pattern. Therefore, according to the antenna-equipped touch panel, a false detection and a ghost phenomenon do not occur.

According to the touch screen, with regard to touch panel components, since the antenna pattern and the detection pattern are separated by a particular distance, electrical coupling does not occur between the antenna and the detection pattern. Therefore, according to the antenna-equipped touch screen including a display device, a false detection and a ghost phenomenon do not occur.

DESCRIPTION OF THE PREFERRED EMBODIMENTS

An antenna-equipped touch panel and a touch screen according to embodiments of the present disclosure are further described below with reference to the drawings. In order to facilitate understanding of the present disclosure, in the figures that are referred to in the present specification, some structural elements are schematically shown, for example, in enlarged form. Therefore, for example, the dimensions and proportions of the structural elements in relation to each other differ from the dimensions and proportions of the actual structural elements. Unless otherwise indicated, for example, the dimensions, the materials, the shapes, and the relative positions of members and portions that are described in the embodiments of the present disclosure are not only limited to the ranges thereof according to the present disclosure, and are merely examples in the description. Further, when, with reference to the drawings, the terms up and down, right and left, vertical and horizontal, etc., are used, these terms are intended to indicate the relationship between the positions of each member. These terms do not limit the scope of the present disclosure to such directions.

Figure 1:
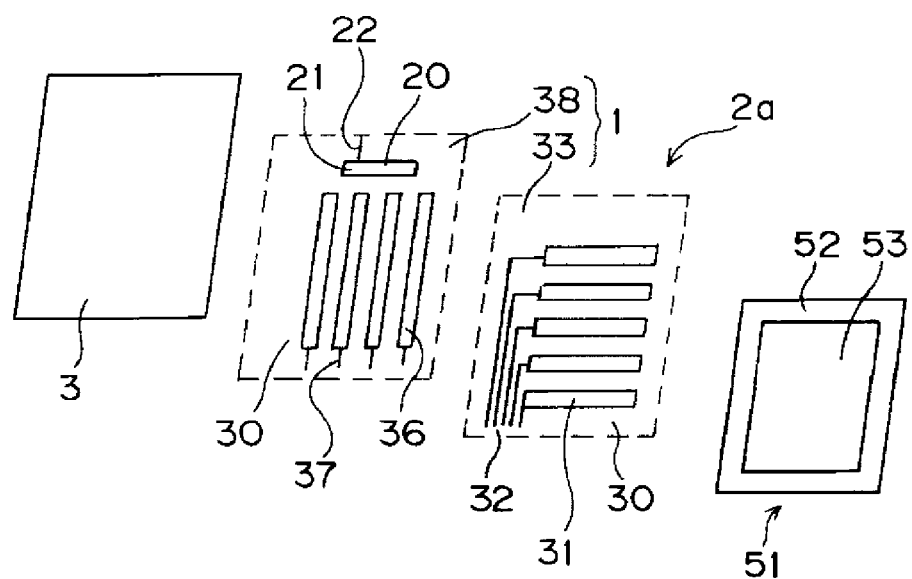
FIG. 1 is an exploded explanatory view of a first touch screen.

FIG. 1 is an exploded explanatory view of a first touch screen 2a. The first touch screen 2a includes a liquid crystal display device 51 (may hereunder be called "LCD") and a touch panel 1 that is laminated on the liquid crystal display device 51. A glass plate 3, which is a surface layer base member, is superimposed upon the touch panel 1.

The liquid crystal display device 51 includes a display surface 53 and an LCD conductor 52. The display surface 53 occupies a large portion of a planar surface of the liquid crystal display device 51, and is a central portion of the planar surface. The LCD conductor 52 corresponds to a peripheral edge portion of the display surface 53, and surrounds the display surface 53 in the form of a frame.

The detecting method of the antenna-equipped touch panel 1 is a capacitive method. The antenna-equipped touch panel 1 includes a first panel surface 33 and a second panel surface 38. A plurality of transmission electrodes (Tx) 31 are disposed on the first panel surface 33. Transmission wires 32 are drawn out from the transmission electrodes (Tx) 31. The transmission electrodes (Tx) 31 and the transmission wires 32 are electrically connected to each other. The plurality of transmission electrodes (Tx) 31 and the plurality of corresponding transmission wires 32 are individually electrically connected to each other.

A plurality of reception electrodes (Rx) 36 are disposed on the second panel surface 38. Reception wires 37 are drawn out from the reception electrodes (Rx) 36. The reception electrodes (Rx) 36 and the reception wires 37 are electrically connected to each other. The plurality of reception electrodes (Rx) 36 and the plurality of corresponding reception wires 37 are individually electrically connected to each other.

The transmission electrodes (Tx) 31 and the reception electrodes (Rx) 36 are transparent to visible light. The transmission electrodes (Tx) 31 and the reception electrodes (Rx) 36 are formed from a conductive film. The transmission wires 32 and the reception wires 37 are formed from a conductive film.

In the present disclosure and in the present specification, the transmission electrodes (Tx) 31 and the reception electrodes (Rx) 36 are together called "electrodes", and the transmission wires 32 and the reception wires 37 are together called "second wires". Further, the electrodes and the second wires are together called a detection pattern 30.

An antenna element 21 and a first wire 22 exist on the second panel surface 38. The antenna element 21 and the first wire 22 are electrically connected to each other. The antenna element 21 and the first wire 22 are formed from a conductive film. The antenna element 21 and the first wire 22 are normally opaque to visible light. This is because, since the antenna element 21 and the first wire 22 are both disposed on a frame of the antenna-equipped touch panel 1, they do not need to be transparent to visible light.

The frame of the antenna-equipped touch panel 1 refers to a peripheral portion of the antenna-equipped touch panel in plan view. Ordinarily, an inner side of the peripheral portion is an operation region of the touch panel and a display region of the display device. The frame is ordinarily not the operation region or the display region.

The antenna element 21 may be disposed at the display region of the display device.

The antenna element that is disposed at the display region of the display device will be formed from a conductive film that is transparent to visible light. Further, even if the antenna element is disposed at either the frame or the display region, the antenna element 21 and the first wire 22 may be transparent to visible light.

In the present disclosure and the present specification, the antenna element 21 and the first wire 22 are together called an antenna pattern 20.

The antenna pattern 20 may be disposed on the first panel surface 33.

Figure 2:
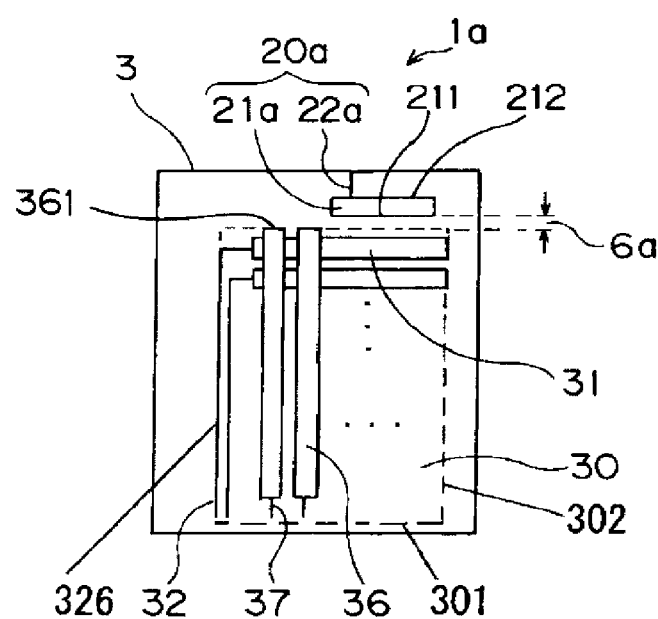
FIG. 2 is a plan perspective view of a first antenna-equipped touch panel.

FIG. 2 is a plan perspective view of a first antenna-equipped touch panel 1*a*.

The planar shape of an antenna element 21*a* is a belt shape. The belt shape may also be expressed as a rectangular shape.

Figure 6:
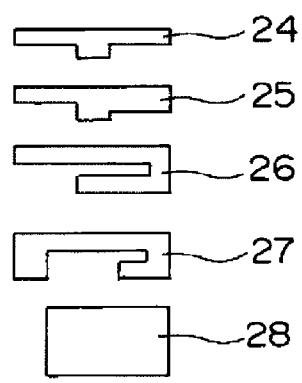
FIG. 6 illustrates exemplary planar shapes of antenna elements.

In the present disclosure, the antenna element may have any planar shape. Regardless of the planar shape of the antenna element, an antenna-equipped touch panel, a touch screen, and equivalents thereof that satisfy the specific items of the present disclosure are included within the technical scope of the present disclosure. The planar shape of the antenna element having an L shape or a belt shape in FIG. 1 is an example. FIG. 6 shows five antenna elements having different planar shapes. An antenna element 24 has a T shape. An antenna element 25 has a shape in which a portion of a T shape is thicker than other portions thereof. An antenna element 26 has a C shape. An antenna element 27 has a shape in which a portion of a C shape is thicker than other portions thereof. An antenna element 28 has a rectangular shape that is close to a square shape. The planar shapes of the antenna elements described above are examples.

A first wire 22*a* that is electrically connected to the antenna element 21*a* extends to an edge line of the first antenna-equipped touch panel 1*a* from the antenna element 21*a*.

An antenna pattern 20*a* is disposed apart from a detection pattern 30.

The detection pattern 30 has a substantially rectangular shape in the plan perspective view of the first antenna-equipped touch panel 1*a*. An upper side of the detection pattern 30 corresponds to upper edge lines 361 of reception electrodes 36. A left side of the detection pattern 30 corresponds to a transmission wire 326. A lower side of the detection pattern 30 corresponds to a broken line 301. A right side of the detection pattern 30 corresponds to a broken line 302. Since the detection pattern 30 includes reception wires 37, if exactly illustrated, the broken line 301 is positioned below its illustrated position. However, here, for example, in order to facilitate understanding, the broken line 301 is shown as being positioned above its actual position. In addition, if exactly illustrated, the broken line 302 is positioned on the right of its illustrated position. However, here, for example, in order to facilitate understanding, the broken line 302 is shown as being positioned on the left of its actual position.

A portion in the antenna pattern 20*a* that is closest to the detection pattern 30 corresponds to a lower edge line 211. A portion in the detection pattern 30 that is closest to the antenna pattern 20*a* corresponds to the upper edge lines 361 of the reception electrodes 36.

The shortest distance between the antenna pattern 20*a* and the detection pattern 30 is shown by arrows 6*a* in the plan perspective view of the first antenna-equipped touch panel 1*a*. The shortest distance is normally greater than or equal to 1.0 mm and less than or equal to 20.0 mm, and is desirably greater than or equal to 2.0 mm and less than or equal to 20.0 mm. This shortest distance makes it possible to prevent electrical coupling between the antenna pattern and the detection pattern if the shortest distance is a value within these ranges. If the upper limit is this value, it is possible to prevent the touch panel from becoming large without purpose. In the present disclosure and the present specification, the aforementioned shortest distance range is called a first distance range.

Figure 3:
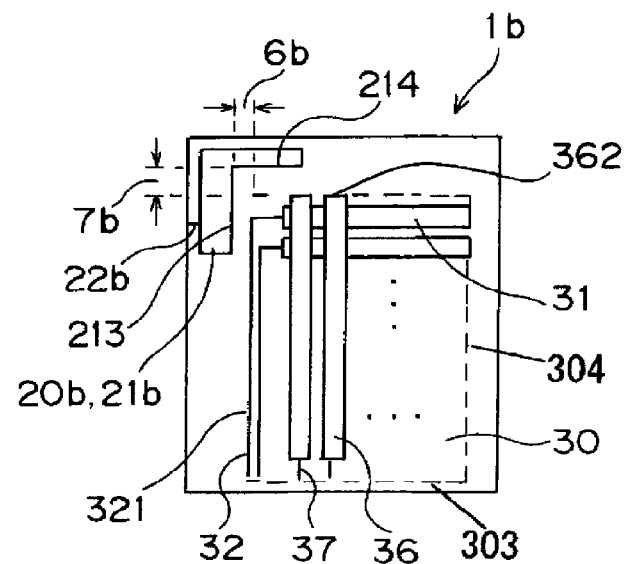
FIG. 3 is a plan perspective view of a second antenna-equipped touch panel.

FIG. 3 is a plan perspective view of a second antenna-equipped touch panel 1*b*. An antenna element 21*b* is positioned on the upper left corner of the second antenna-equipped touch panel 1*b*. The planar shape of the antenna element 21*b* is an L shape. The L shape may also be expressed as a right-angled shape. A first wire 22*b* that is electrically connected to the antenna element 21*b* extends to an edge line of the second antenna-equipped touch panel 1*b* from the antenna element 21*b*.

An antenna pattern 20*b* is disposed apart from a detection pattern 30 in the plan perspective view of the second antenna-equipped touch panel 1*b*.

The detection pattern 30 has a substantially rectangular shape in the plan perspective view of the second antenna-equipped touch panel 1*b*. An upper side of the detection pattern 30 corresponds to upper edge lines 362 of reception electrodes 36. A left side of the detection pattern 30 corresponds to a transmission wire 321. A lower side of the detection pattern 30 corresponds to a broken line 303. A right side of the detection pattern 30 corresponds to a broken line 304. Since the detection pattern 30 includes reception wires 37, if exactly illustrated, the broken line 303 is positioned so as to coincide with a lower-side edge line of the second antenna-equipped touch panel 1*b*. However, here, for example, in order to facilitate understanding, the broken line 303 is shown as being positioned above its actual position. In addition, if exactly illustrated, the broken line 304 is positioned on the right of its illustrated position. However, here, for example, in order to facilitate understanding, the broken line 304 is shown as being positioned on the left of its actual position.

The distance between the antenna pattern 20*b* and the detection pattern 30 in the left-right direction is indicated by arrows 6*b* in the plan perspective view of the second antenna-equipped touch panel 1*b*. The interval distance indicated by the arrows 6*b* is a distance between an inner vertical edge line 213 of the antenna element 21*b* and the transmission wire 321.

The distance between the antenna pattern 20*b* and the detection pattern 30 in the up-down direction is indicated by arrows 7*b* in the plan perspective view of the second antenna-equipped touch panel 1*b*. The interval distance indicated by the arrows 7*b* is a distance between an inner horizontal edge line 214 of the antenna element 21*b* and the upper edge lines 362 of the reception electrodes (Rx) 36.

Comparing the length indicated by the arrows 6*b* and the length indicated by the arrows 7*b*, the length indicated by the arrows 6*b* is smaller. Therefore, the shortest distance between the antenna pattern 20*b* and the detection pattern 30 corresponds to the length indicated by the arrows 6b in the plan perspective view of the second antenna-equipped touch panel 1b.

The length indicated by the arrows 6b is set in the first distance range, and makes it possible to prevent electrical coupling between the antenna pattern 20b and the detection pattern 30.

Figure 4:
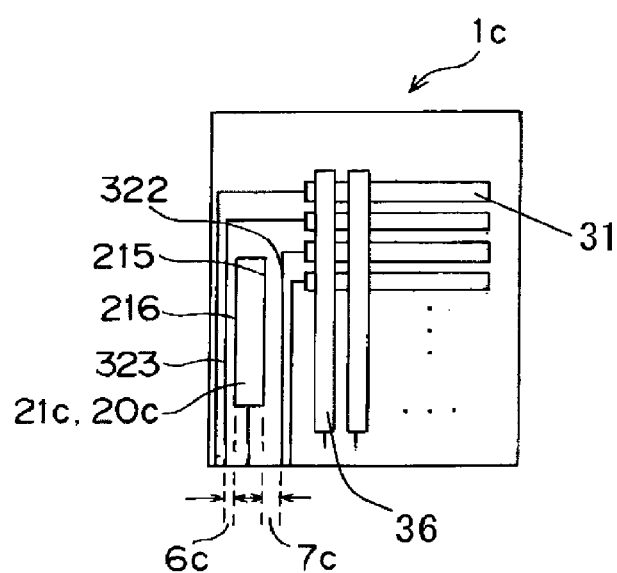
FIG. 4 is a plan perspective view of a third antenna-equipped touch panel.

FIG. 4 is a plan perspective view of a third antenna-equipped touch panel 1c. In the plan perspective view of the third antenna-equipped touch panel 1c, a pattern including a plurality of transmission wires has a substantially C shape that opens in a downward direction. An inner upper side and an inner left side correspond to a transmission wire 323, and an inner right side corresponds to a transmission wire 322.

In the plan perspective view of the third antenna-equipped touch panel 1c, an antenna element 21c is surrounded by transmission wires in three directions, that is, in a rightward direction, an upward direction, and a leftward direction; and a lower side of the antenna element 21c is surrounded by a lower edge line of the third antenna-equipped touch panel 1c. In a detection pattern including electrodes and second wires, the second wires are closer to the antenna element 21c.

In the plan perspective view of the third antenna-equipped touch panel 1c, an interval distance between an antenna pattern 20c and a detection pattern 30 on the left side of the antenna pattern 20c is indicated by arrows 6c. The interval distance indicated by the arrows 6c is a distance between a left edge line 216 of the antenna element 21c and the transmission wire 323.

In the plan perspective view of the third antenna-equipped touch panel 1c, the interval distance between the antenna pattern 20c and the detection pattern 30 on the right side of the antenna pattern 20c is indicated by arrows 7c. The interval distance indicated by the arrows 7c is a distance between a right edge line 215 of the antenna element 21c and the transmission wire 322.

Comparing the length indicated by the arrows 6c and the length indicated by the arrows 7c, the length indicated by the arrows 6c is smaller. Above the antenna pattern 20c, there is a large distance between it and the transmission wires. Below the antenna pattern 20c, there is no detection pattern 30. Therefore, in the plan perspective view of the third antenna-equipped touch panel 1c, the shortest distance between the antenna pattern 20c and the detection pattern 30 is the length indicated by the arrows 6c. The length indicated by the arrows 6c is set in the first distance range, and makes it possible to prevent electrical coupling between the antenna pattern 20b and the detection pattern 30.

In FIG. 4, three vertically positioned points that are located below four transmission electrodes (Tx) 31 indicate that the remaining transmission electrodes (Tx) are similarly arranged, and three horizontally arranged points that are located on the right of two reception electrodes (Rx) 36 indicate that the remaining reception electrodes are similarly arranged.

Figure 5:
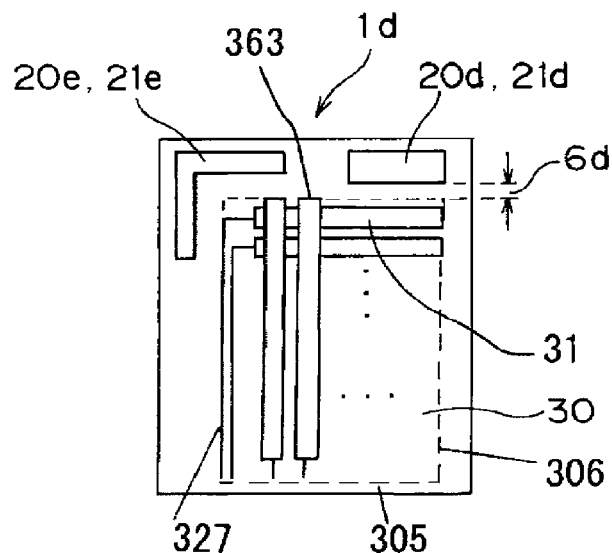
FIG. 5 is a plan perspective view of a fourth antenna-equipped touch panel.

FIG. 5 is a plan perspective view of a fourth antenna-equipped touch panel 1d.

The fourth antenna-equipped touch panel 1d includes two antenna patterns 20d and 20e. An antenna element 21d of the antenna pattern 20d has a belt shape. An antenna element 21e of the antenna pattern 20e has an L shape.

In the plan perspective view of the fourth antenna-equipped touch panel 1d, a detection pattern 30 has a substantially rectangular shape. An upper side of the detection pattern 30 corresponds to upper edge lines 363 of reception electrodes 36. A left side of the detection pattern 30 corresponds to a transmission wire 327. A lower side of the detection pattern 30 corresponds to a broken line 305. A right side of the detection pattern 30 corresponds to a broken line 306. Since the detection pattern 30 includes reception wires 37, if exactly illustrated, the broken line 305 is positioned so as to coincide with a lower-side edge line of the fourth antenna-equipped touch panel 1d. However, here, for example, in order to facilitate understanding, the broken line 305 is shown as being positioned above its actual position. In addition, if exactly illustrated, the broken line 306 is positioned on the right of its illustrated position. However, here, for example, in order to facilitate understanding, the broken line 306 is shown as being positioned on the left of its actual position.

The two antenna patterns 20d and 20e are each disposed apart from the detection pattern 30. Of the two antenna patterns 20d and 20e, the antenna pattern 20d is closer to the detection pattern 30.

In the plan perspective view of the fourth antenna-equipped touch panel 1d, the interval distance between the antenna pattern 20d and the detection pattern 30 is indicated by arrows 6d. The length indicated by the arrows 6d is the shortest distance between the antenna pattern 20d or the antenna pattern 20e and the detection pattern 30. The length indicated by the arrows 6d is set in the first distance range, and makes it possible to prevent electrical coupling between the antenna pattern 20d and the detection pattern 30.

The antenna patterns 20 and the detection pattern 30 are made of, for example, ITO (indium tin oxide), a transparent conductive ink (such as silver nanowire ink), a conductive paste (such as a paste containing metallic particles and binder resin), or a copper thin film. Portions of these patterns that are positioned directly above a display surface of a display device only need to be made of a material that is transparent to visible light, and portions of these patterns that are positioned at a frame of the display device may be made of a material that is opaque to visible light or a material that is transparent to visible light.

The first panel surface and the second panel surface described with reference to FIG. 1 may be the front and the back surface of one base member (not shown), respectively. Alternatively, one of the surfaces of one of the two base members may be the first panel surface, and one of the surfaces of the other of the two base members may be the second panel surface. Still alternatively, a surface of the glass plate, which is a surface layer base member, may be the first panel surface and/or the second panel surface. Still alternatively, one of the surfaces of one base member may be the first panel surface and the second panel surface.

Here, "a single surface being the first panel surface and the second panel surface" refers to detection electrodes in which the transmission electrodes (Tx) and the reception electrodes (Rx) are formed on the same surface and are superimposed upon each other at their intersection points in an insulated state.

The antenna pattern may be formed on the first panel surface or the second panel surface in the above-described embodiment. Alternatively, it is possible to form a base member on which the antenna pattern is formed and to superimpose, for example, a base member on which the detection pattern is formed upon the base member on which the antenna pattern is formed.

As described above, since, in the first antenna-equipped touch panel 1a, the second antenna-equipped touch panel 1b, the third antenna-equipped touch panel 1c, and the fourth antenna-equipped touch panel 1d, the antenna pattern 20a and the detection pattern 30, the antenna pattern 20b and the detection pattern 30, the antenna pattern 20c and the detection pattern 30, and the antenna pattern 20d and the detection pattern 30 are separated by a particular distance, electrical coupling does not occur between the antenna and the detection pattern. In order to reliably prevent electrical coupling between the antenna and the detection pattern, it is desirable not only to provide this particular distance, but also to, for example, as shown in FIG. 7, dispose a pattern 60, which is formed from a low relative dielectric constant layer, between the antenna pattern and the detection pattern in plan perspective view.

Figure 7:
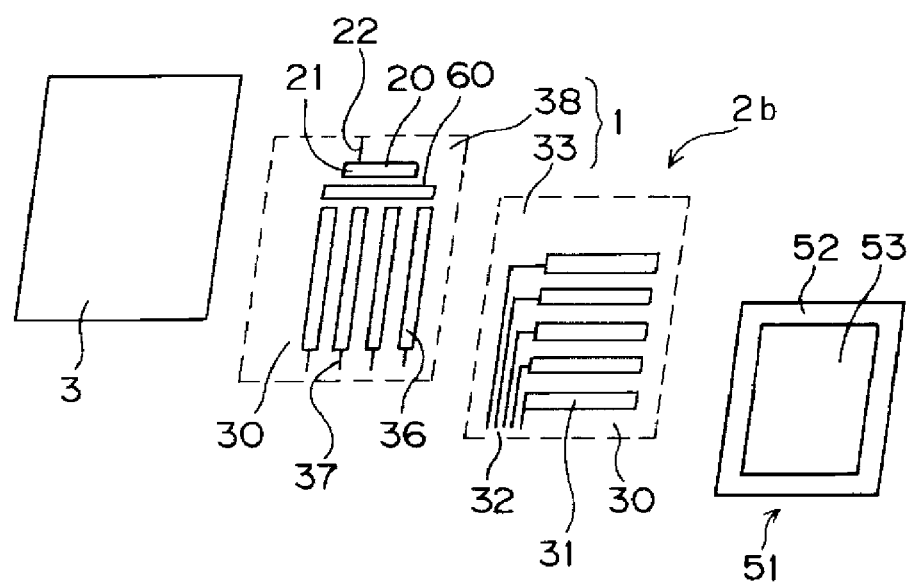
FIG. 7 is an exploded explanatory view of a second touch screen.

FIG. 7 is an exploded explanatory view of a second touch screen 2b. As with the first touch screen 2a, the second touch screen 2b includes a liquid crystal display device 51 and a touch panel 1 that is laminated on the liquid crystal display device 51. A glass plate 3, which is a surface layer base member, is superimposed upon the touch panel 1.

The second touch screen 2b differs from the first touch screen 2a in that in addition to a plurality of reception electrodes (Rx) 36, a plurality of reception wires 37, an antenna element 21, and a first wire 22, the pattern 60, which is formed from the low relative dielectric constant layer, described above exists on a second panel surface 38 of the antenna-equipped touch panel 1. The other structural features are the same as those of the first touch screen 2a, and are thus not described.

The relative dielectric constant of the low relative dielectric constant layer is normally greater than 1.0 and less than or equal to 2.5, and, desirably, greater than or equal to 1.5 and less than or equal to 2.5. When the relative dielectric constant of the low relative dielectric constant layer is in this range, it is possible to further reduce the degree of electrical coupling between the antenna pattern and the detection pattern. Since the relative dielectric constant (Er) of 1.0 is the value of the relative dielectric constant of air, a pattern layer having a relative dielectric constant (Er) value of 1.0 or less cannot be realized. When the relative dielectric constant (Er) value exceeds 2.5, electrical coupling is unlikely to be reduced.

As the low relative dielectric constant layer, for example, it is possible to use ink that contains a solid having a low relative dielectric constant and that is mixed in resin and whose apparent relative dielectric constant is lower than that of the resin before the mixing. Instead of mixing a solid in resin, air bubbles may be mixed in resin. An example of resin before the mixing is acrylic resin.

The planar shape of the pattern 60, which is formed from the low dielectric layer, is a belt shape. The belt shape may be expressed as a rectangular shape.

Although, in the present disclosure, the pattern 60, which is formed from the low relative dielectric constant layer, may have any planar shape, it is more desirable that the pattern 60 have a shape extending along the shape of a region existing between the antenna pattern and the detection pattern from the viewpoint of reducing the degree of electrical coupling.

Figure 8:
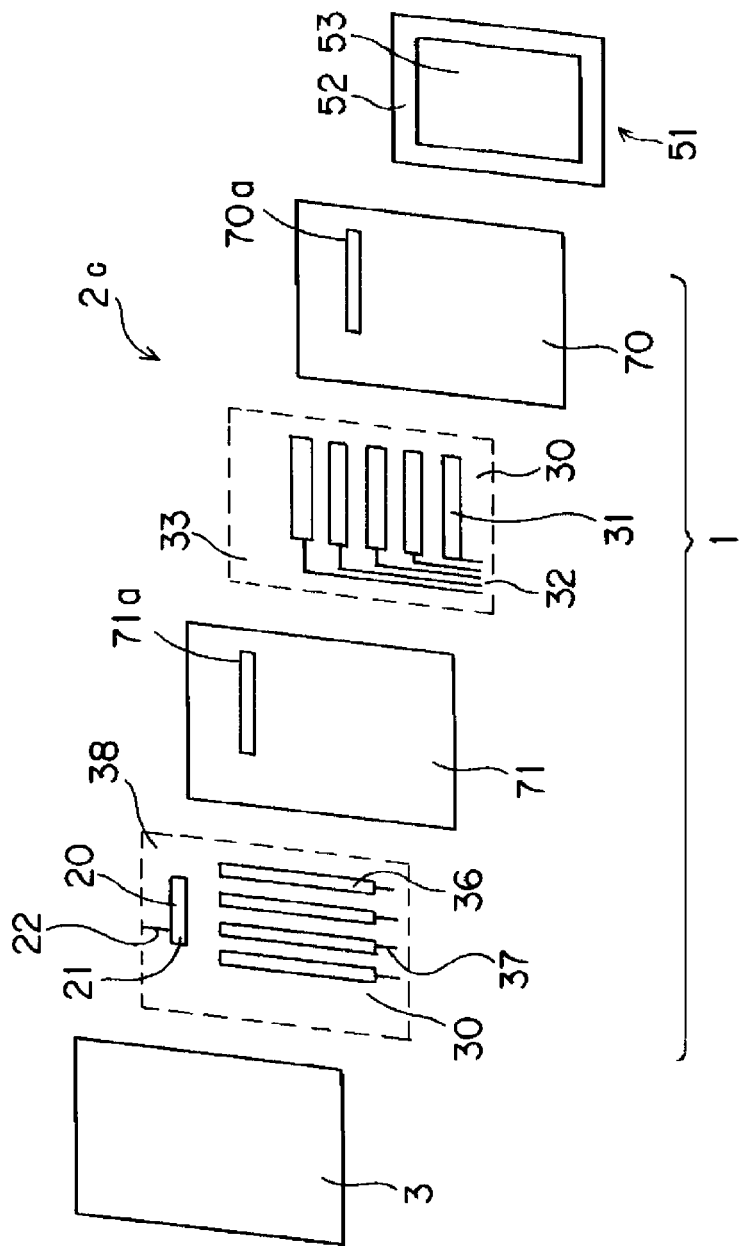
FIG. 8 is an exploded explanatory view of a third touch screen.

Instead of disposing the pattern 60, which is formed from the low relative dielectric constant layer, the following may be performed in order to provide the same effects. That is, in plan perspective view, at a location between the antenna pattern 20 and the detection pattern 30, of the aforementioned base members 70 and 71 that constitute the first panel surface and the second panel surface, an opening 71a may be formed in at least the base member on which the antenna pattern is formed. FIG. 8 is an exploded explanatory view of a third touch screen 2c. In FIG. 8, one of the surfaces of one of the two base members 70 and 71 is a first panel surface 33, and one of the surfaces of the other of the two base members 70 and 71 is a second panel surface 38; and the two base members 70 and 71 have respective openings 70a and 71a. When the base member 70 has the opening 70a and the base member 71 has the opening 71a, that is, when they have portions where base materials do not exist, electrical coupling between the antenna and the detection pattern is definitely unlikely to occur. Although, in FIG. 8, an example in which the two base members 70 and 71 have the respective openings 70a and 71a is illustrated, at least the base member 70 having the antenna pattern 20 needs to have the opening 70a.

Figure 9:
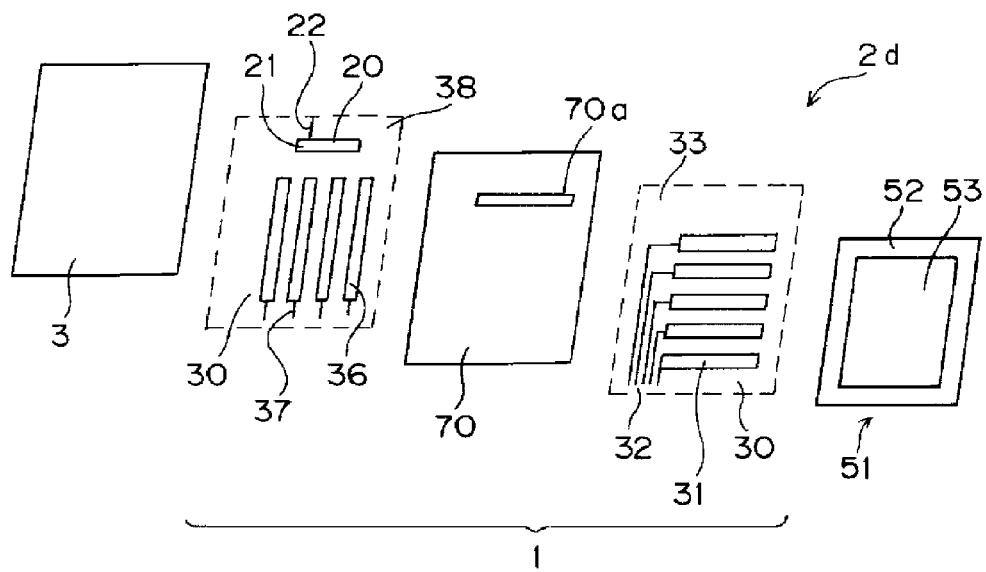
FIG. 9 is an exploded explanatory view of a fourth touch screen.
Figure 10:
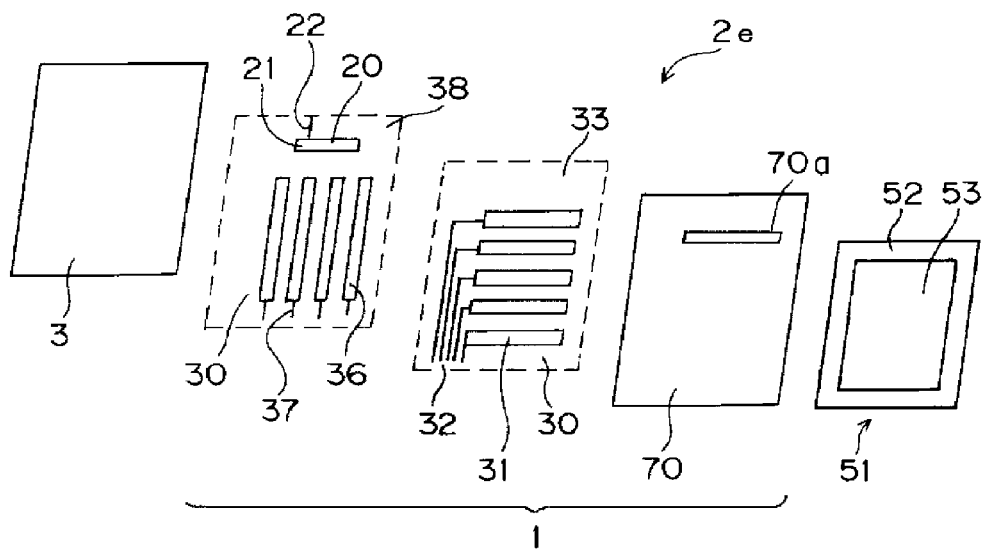
FIG. 10 is an exploded explanatory view of a fifth touch screen.

FIG. 9 is an exploded explanatory view of a fourth touch screen 2d. FIG. 10 is an exploded explanatory view of a fifth touch screen 2e. As shown in FIG. 9, one of the surfaces of one base member having an opening 70a may be a first panel surface 33, and the other surface of this base member may be a second panel surface 38. As shown in FIG. 10, one of the surfaces of one base member having an opening 70a may be a first panel surface 33 and a second panel surface 38.

Planar shapes of the openings 70a and 71a are each a belt shape. The belt shape may also be expressed as a rectangular shape.

Although, in the present disclosure, each of the openings 70a and 71a may have any planar shape, it is more desirable that each of the openings 70a and 71a have a shape extending along the shape of a region existing between the antenna pattern and the detection pattern from the viewpoint of reducing the degree of electrical coupling.

Embodiments in which the present disclosure is applied to a capacitive touch panel are described. The present disclosure is applicable to touch panels other than to capacitive touch panels, such as a resistance-film type touch panel.

As the display device, a liquid crystal display device, an organic EL display device, etc. may be used.

What is claimed is:

1. An antenna-equipped touch panel that is laminated on a display device in order to be used, comprising:
an antenna pattern that includes an antenna element and a first wire of an antenna, the first wire being electrically connected to the antenna element, the antenna pattern being formed from a conductive film;
a detection pattern that includes electrodes and second wires of the touch panel, the second wires being electrically connected to the electrodes, the detection pattern being formed from a conductive film; and
a base member, one surface of surfaces of the base member being a first panel surface, and another surface of the surfaces of the base member opposite to the one surface being a second panel surface,
wherein, in plan perspective view, a shortest distance between the antenna pattern and the detection pattern is greater than or equal to 1.0 mm and less than or equal to 20.0 mm,
wherein a detecting method of the touch panel is a capacitive method,
wherein the electrodes include a plurality of transmission electrodes (Tx) and a plurality of reception electrodes (Rx),
wherein the second wires include transmission wires that are drawn out from the transmission electrodes (Tx) and reception wires that are drawn out from the reception electrodes (Rx),
wherein the transmission electrodes (Tx) and the transmission wires of the detection pattern are disposed on the first panel surface of the base member, wherein the reception electrodes (Rx) and the reception wires of the detection pattern are disposed on the second panel surface of the base member, wherein the antenna element and the first wire of the antenna pattern are disposed on a peripheral edge portion of at least one of the first panel surface and the second panel surface of the base member in the plan perspective view, wherein, in the plan perspective view, the base member has a gap area between a first area of the base member where the antenna pattern is disposed and a second area of the base member where the detection pattern is disposed such that the first area and the second area do not overlap in the plan perspective view, and wherein, in the plan perspective view, the base member has an opening between the antenna pattern the detection pattern, the opening passing through the base member from the first panel surface to the second panel surface, and the opening being provided in the gap area of the base member.

2. An antenna-equipped touch panel that is laminated on a display device in order to be used, comprising:

an antenna pattern that includes an antenna element and a first wire of an antenna, the first wire being electrically connected to the antenna element, the antenna pattern being formed from a conductive film;

a detection pattern that includes electrodes and second wires of the touch panel, the second wires being electrically connected to the electrodes, the detection pattern being formed from a conductive film;

a first base member, the first base member having opposite sides of a first side and a second side, and one of surfaces of the first base member being a first panel surface; and a second base member, the second base member having opposite sides of a third side and a fourth side, one of surfaces of the second base member being a second panel surface, and the first and second base members being attached with each other by attaching the second side and the third side, wherein, in plan perspective view, a shortest distance between the antenna pattern and the detection pattern is greater than or equal to 1.0 mm and less than or equal to 20.0 mm, wherein a detecting method of the touch panel is a capacitive method, wherein the electrodes include a plurality of transmission electrodes (Tx) and a plurality of reception electrodes (Rx), wherein the second wires include transmission wires that are drawn out from the transmission electrodes (Tx) and reception wires that are drawn out from the reception electrodes (Rx), wherein the transmission electrodes (Tx) and the transmission wires of the detection pattern are disposed on the first panel surface of the first base member, wherein the reception electrodes (Rx) and the reception wires of the detection pattern are disposed on the second panel surface of the second base member, wherein the antenna element and the first wire of the antenna pattern are disposed on a peripheral edge portion of at least one of the first panel surface and the second panel surface in the plan perspective view, wherein, in the plan perspective view, one of the first and second base members having the antenna pattern thereon has a gap area between a first area of the one of the first and second base members where the antenna pattern is disposed and a second area of the one of the first and second base members where the detection pattern is disposed such that the first area and the second area do not overlap in the plan perspective view, and wherein, in the plan perspective view, the one of the first and second base members having the antenna pattern thereon has an opening between the antenna pattern and the detection pattern, the opening passing through both of the first and second base members from the first side of the first base member to the fourth side of the second base member, and the opening being provided in the gap area of the one of the first and second base members.

3. An antenna-equipped touch panel that is laminated on a display device in order to be used, comprising:

an antenna pattern that includes an antenna element and a first wire of an antenna, the first wire being electrically connected to the antenna element, the antenna pattern being formed from a conductive film;

a detection pattern that includes electrodes and second wires of the touch panel, the second wires being electrically connected to the electrodes, the detection pattern being formed from a conductive film; and a base member, one surface of surfaces of the base member being a first panel surface, and another surface of the surfaces of the base member opposite to the one surface being a second panel surface, wherein, in plan perspective view, a shortest distance between the antenna pattern and the detection pattern is greater than or equal to 1.0 mm and less than or equal to 20.0 mm, wherein a detecting method of the touch panel is a capacitive method, wherein the electrodes include a plurality of transmission electrodes (Tx) and a plurality of reception electrodes (Rx), wherein the second wires include transmission wires that are drawn out from the transmission electrodes (Tx) and reception wires that are drawn out from the reception electrodes (Rx), wherein the transmission electrodes (Tx) and the transmission wires of the detection pattern are disposed on the first panel surface of the base member, wherein the reception electrodes (Rx) and the reception wires of the detection pattern are disposed on the first panel surface of the base member, wherein the antenna element and the first wire of the antenna pattern are disposed on a peripheral edge portion of at least one of the first panel surface and the second panel surface of the base member in the plan perspective view, wherein, in the plan perspective view, the base member has a gap area between a first area of the base member where the antenna pattern is disposed and a second area of the base member where the detection pattern is disposed such that the first area and the second area do not overlap in the plan perspective view, and wherein, in the plan perspective view, the base member has an opening between the antenna pattern and the detection pattern, the opening passing through the base member from the first side of the base member to the second side of the base member, and the opening being provided in the gap area of the base member.

4. A touch screen comprising:
a display device; and an antenna-equipped touch panel that is laminated on the display device,
wherein the antenna-equipped touch panel is the antenna-equipped touch panel according to claim 1.

5. A touch screen comprising:
a display device; and
an antenna-equipped touch panel that is laminated on the display device,
wherein the antenna-equipped touch panel is the antenna-equipped touch panel according to claim 2.

6. A touch screen comprising:
a display device; and
an antenna-equipped touch panel that is laminated on the display device,
wherein the antenna-equipped touch panel is the antenna-equipped touch panel according to claim 3.

* * * * *